United States Patent Office 3,684,491
Patented Aug. 15, 1972

3,684,491
PROCESS FOR THE RECOVERY OF COBALT
Thomas H. Coffield, 4430 Patrick Road, Orchard Lake, Mich. 48033; Gordon G. Knapp, 27625 Vermont Drive, Southfield, Mich. 48075; and James G. Jolly, 27665 E. California, Lathrup Village, Mich. 48075
No Drawing. Filed Apr. 29, 1971, Ser. No. 138,756
Int. Cl. C22b 3/00
U.S. Cl. 75—103
7 Claims

ABSTRACT OF THE DISCLOSURE

A process for recovery of cobalt under conditions favoring the formation of cobalt tetracarbonyl anion; e.g., specifically the addition of a strong base such as alkali metal hydroxides, carbonates and oxides, during the reductive carbonylation of a reducible cobalt salt which stabilizes the formation of the cobalt tetracarbonyl anion for subsequent recovery of the cobalt values.

BACKGROUND OF THE INVENTION

Recent developments in the recovery of metals from ores have combined a unique process of hydrometallurgy and vapometallurgy to simultaneously liberate and separate such metals as copper, nickel and cobalt. This process is termed reductive carbonylation. Reductive carbonylation is the step of contacting an aqueous ammoniacal solution or slurry of reducible metal salts, such as nickel or cobalt with a carbon monoxide-containing gas at temperatures and pressures and in the presence of promoters whereby the nickel is converted to nickel carbonyl and the cobalt is converted to cobalt tetracarbonyl anion. In these forms the nickel carbonyl is easily volatilized or extracted from the aqueous reaction mixture and the cobalt tetracarbonyl anion remains in solution.

Under certain conditions the conversion of cobalt is not very great; and considerable amounts of this valuable metal may be lost by precipitating from the aqueous reaction mixture. Thus, a need exists for an improved process for the recovery of cobalt as cobalt tetracarbonyl anion in the aqueous reaction mixture.

It is an object of this invention to provide an improved process for the recovery of cobalt from aqueous solutions or slurries containing cobalt compounds. A further object of this invention is to provide a process for the recovery of cobalt from a reducible cobalt salt in the form of cobalt tetracarbonyl anion which remains in the aqueous reaction mixture. A still further object of this invention is to provide a process for obtaining high yields of cobalt tetracarbonyl anion from an improved process of reductively carbonylating an aqueous solution or slurry of reducible nickel and cobalt compounds. Further objects will become readily apparent from the following disclosure of the process of this invention.

SUMMARY OF THE INVENTION

It has now been found that the above and other objects of this invention can be accomplished by providing in a process for the recovery of cobalt from an aqueous ammoniacal ammonium salt solution or slurry of a reducible cobalt salt, said process comprising contacting said solution or slurry with a carbon monoxide-containing gas at a carbon monoxide pressure of from 100 to 1000 p.s.i.g. and a temperature of from 100 to 400° C. in the presence of a catalytic amount of a ligand selected from the group consisting of cyanide, sulfide, cysteine, and tartrate to form soluble cobalt tetracarbonyl anion, and decomposing the cobalt tetracarbonyl anion by known means to recover its cobalt value, the improvement comprising adding a sufficient amount of a strong base to stabilize the formation of cobalt tetracarbonyl anion prior to the step of carrying out said contacting.

Another aspect of this invention is provided in a process for recovering cobalt from a solution or slurry formed by first partially reducing and then oxidatively leaching a lateritic ore with aqueous ammoniacal ammonium carbonate, contacting said solution or slurry with a carbon monoxide-containing gas at a pressure of from 100 to 1000 p.s.i.g. and a temperature of from 100 to 400° C. in the presence of a catalytic amount of a ligand selected from the group consisting of cyanide, sulfide, cysteine, and tartrate to form soluble cobalt tetracarbonyl anion, injecting an oxygen-containing gas into the reaction mixture formed to oxidize the cobalt values to insoluble hydrated cobalt oxide, separating said hydrated cobalt oxide from said reaction mixture, heating said hydrated cobalt oxide to drive off the waters of hydration and recovering the cobalt oxide produced, the improvement comprising adding from 1 to 2 moles, per mole of cobalt, of a strong base selected from the group consisting of NaOH, $Na_2CO_3$, and KOH prior to carrying out said contacting.

DETAILED DESCRIPTION OF THE PREFERRED EMBODIMENTS

The process of this invention is an improved process for reductive carbonylation whereby high yields of cobalt as cobalt tetracorbonyl anion are obtained. By the term "reductive carbonylation" is meant a process in which a solution or slurry of a reducible metal compound or mixture thereof, such as nickel or cobalt, is contacted with a carbon monoxide-containing gas under conditions whereby the nickel is converted to nickel carbonyl, $Ni(CO)_4$; the cobalt is converted to cobalt tetracarbonyl anion, $Co(CO)_4^-$; and as such, the metals are easily separated and recovered.

More particularly, the solution or slurry can be an ammonium salt solution or slurry; preferably it is an aqueous ammoniacal ammonium salt solution or slurry. The salts can be selected from aqueous ammoniacal ammonium chloride, carbonate, sulfate, mixtures thereof, and in addition can be aqueous ammonium hydroxide. The amount of ammonia, $NH_3$, in the ammonium salt solution or slurry can range from 0 to about 16 moles of $NH_3$ per mole of metal; more preferred ranges of $NH_3$ are from 0 to 10 moles of $NH_3$ per mole of metal in the general process. For the purposes of this invention it is preferred to utilize from 4 to 10 moles of $NH_3$ per mole of metal.

Reducible metal salts which can be used in the reductive carbonylation process are the water soluble salts of nickel and cobalt such as the fluorides, chloride, bromides, iodides, sulfates, acetates, ammonium chlorides, ammonium sulfates, and the like. Further, the normally insoluble nickel and cobalt salts which are rendered at least partially soluble by an agent such as ammonia; e.g., the carbonates, oxides, phosphates, hydroxides, basic carbonates, and the like are also included.

These reducible metal salts in the solution or slurry are contacted with a carbon monoxide-containing gas, such as, pure carbon monoxide or synthesis gas and the like, at a carbon monoxide pressure of from 100 to about 1000 p.s.i.g. The reaction system is brought to and maintained at a temperature of from 100 to about 400° C. It should be noted that the pressures and temperatures used are not critical but are dependent on the economics of rate of reaction and capital investment in processing equipment. In the improved process of this invention, CO pressures and temperatures described above are useful; however, preferred conditions of 300 to 500 p.s.i.g. of CO and 130 to 170° C. are employed.

It has been found convenient to employ a promoter for the formation of nickel carbonyl and cobalt tetracarbonyl anion in the reductive carbonylation process. Such promoters are ligands capable of forming a complex with the nickel and cobalt in the solution or slurry, and thus, facilitate the conversion of nickel to nickel carbonyl and cobalt to cobalt tetracarbonyl anion. Complex-forming ligands, such as cyanide, sulfide, cysteine, and tartrate, promote the formation of nickel carbonyl and cobalt tetracarbonyl anion when added to the solution in catalytic amounts as any convenient form subject to the limitation that the catalytic species be soluble in the solution or slurry to be reductively carbonylated. The preferred promoter is cyanide anion. Amounts of the promoter or catalyst ligand of from 0.01 to 1 mole of promoter per mole of metal can be added to the solution or slurry. Preferred in the process of this invention is the use of from 0.01 to about 0.5 mole of catalyst per mole of metal in the solution or slurry.

Under the above-described conditions for the reductive carbonylation process, the yield of nickel carbonyl produced from nickel-containing solutions or slurries is nearly quantitative. However, while the cobalt is converted to the cobalt tetracarbonyl anion in good yield, a significant portion thereof is either not reacted or is converted to insoluble compounds which precipitate from the reaction mixture and are found in the residue.

It has now been found that the formation of cobalt tetracarbonyl anion is stabilized and high yields of the cobalt tetracarbonyl anion are obtained in a reductive carbonylation process, when a strong base is added to the solution or slurry prior to the contacting step. The reductive carbonylation process is improved by adding a sufficient amount of a strong base to stabilize the formation of cobalt tetracarbonyl anion.

The strong base can be typically selected from alkali and alkaline earth metal hydroxides, carbonates, and oxides. Such compounds in the alkali metal series as sodium, potassium, and the like; and in the alkaline earth metal series as calcium, strontium, barium, and the like can be utilized to form the strong bases used in this improved process. Especially preferred strong bases are selected from the group consisting of $NaOH$, $Na_2CO_3$, $NaHCO_3$, $Na_2O$, $KOH$, $K_2CO_3$, $K_2O$, $CaO$, $CaCO_3$, $Ba(OH)_2$, $BaCO_3$, $BaO$, and the like. Most particularly preferred strong bases are selected from $KOH$, $NaOH$, and $Na_2CO_3$.

All that is required for good results to be obtained in this improved process is that sufficient strong base be added to the solution or slurry to stabilize the formation of cobalt tetracarbonyl anion. The improved process is carried out by adding from 1 to about 10 moles of said strong base per mole of cobalt. More preferred reductive carbonylation conditions are from about 1 to 2 moles of the base when the solution or slurry contains ammonia.

The amount of base required in part depends on the amount of ammonia in the solution or slurry. At high ammonia concentrations only 1 mole of base is required to stabilize each mole of cobalt tetracarbonyl anion. However, at lower ammonia concentrations a considerably greater amount of base is required.

Thus, for example when using only 1 mole of base it is preferred to have present in the solution or slurry from about 8 to 16 moles of $NH_3$. On the other hand, the addition of 10 moles of base will allow the amount of $NH_3$ used to preferably range from about 0 to 8 moles of $NH_3$. Of course, the ratio of base to $NH_3$ is not fixed, but can vary within the limits set forth. Both higher and lower ratios of base to $NH_3$ can be used but problems of reagent cost and yield indicate the above ranges are more practical.

Thus, accordingly the process conditions have been established whereby high yields of cobalt tetracarbonyl anion may be obtained without sacrificing conversion of nickel to nickel carbonyl. Subsequently, these compounds are easily separated and recovered. The preferred conditions by which this improved reductive carbonylation process is carried out are summarized in mole ratios as follows:

$NH_3$/metal=0:1–16:1
Co/Ni=0.1:1–10:1
CO pressure=100–1000 p.s.i.g.
temperature=100–400° C.
$CN^-$ cat/metal=0.01–0.5
base/Co=1–10

After formation of the stabilized aqueous solution containing cobalt tetracarbonyl anion, the cobalt value can readily be recovered by decomposing the cobalt tetracarbonyl anion according to known methods. One such method is by injecting an oxygen-containing gas into the reaction mixture formed to oxidize the cobalt values to insoluble hydrated cobalt oxide, separating said hydrated cobalt oxide from said reaction mixture, heating said hydrated cobalt oxide to drive off the waters of hydration and recovering the cobalt oxide produced. In some sources of nickel and cobalt, appreciable quantities of copper are also present. In the reductive carbonylation process the copper in the form of reducible copper compounds are converted to either copper metal, insoluble copper carbonate, or a soluble copper carbonyl complex. In the first two forms copper is easily separated from the reaction mixture by simple filtration. In the form of the copper carbonyl complex, it remains soluble on oxidation of the cobalt tetracarbonyl anion to cobalt oxide and therefore presents no problem with respect to cobalt recovery.

This process will be more clearly illustrated by the following examples. Example 1 is presented for comparative purposes to establish the recovery of cobalt as $Co(CO)_4^-$ in the absence of added strong base.

EXAMPLE 1

To a 300 milliliter stainless steel reaction vessel equipped with a stirrer, charge and vent lines, and a thermocouple for measuring temperature was added 4 parts of cobalt chloride hexahydrate, 10.3 parts of concentrated (30 percent) ammonium hydroxide, 7.4 parts of $$(NH_4)_2CO_3$$

and 0.325 part of potassium cyanide. The reaction vessel was sealed, flushed three times with carbon monoxide, and pressured with carbon monoxide to 50 p.s.i.g. The reaction vessel was then heated to 125° C., and the carbon monoxide increased to 300 p.s.i.g. The stirrer was then activated. After two hours no pressure drop had taken place indicating that no carbonylation had occurred. The reaction vessel was cooled and the carbon monoxide vented, and the reaction vessel was flushed with nitrogen. The aqueous reaction mixture was transferred to a flask under nitrogen, and a heavy pink solid in the reaction mixture was filtered therefrom and analyzed by X-ray diffraction and standard analysis for cobalt. The analysis showed the pink solid to be cobalt carbonate. The filtrate from the reaction mixture tested negative for cobalt tetracarbonyl anion by failure to form a precipitate on reaction with tetraethyl ammonium iodide complex.

In contrast, when a strong base is added to the reaction mixture prior to carbonylation, such as sodium hydroxide or sodium carbonate, the reaction produces cobalt tetracarbonyl anion with good results. The following example illustrates a process similar to that in Example 1 with the addition of sodium hydroxide.

EXAMPLE 2

To a reaction vessel similar to that described in Example 1 was added 4 parts of cobalt chloride hexahydrate, 3.3 parts of ammonium carbonate, and 10 parts of water, 70.2 parts of concentrated (30 percent) ammonium hydroxide, 0.195 part of potassium cyanide, and 1 part sodium hydroxide. The carbonylation was carried out similarly as in Example 1. The reaction vessel was closed, flushed with carbon monoxide, pressured to 250 p.s.i.g., with carbon monoxide and heated to 125° C. The pressure increased to 300 p.s.i.g. of carbon monoxide and stirring was started. Over a period of four hours there was an uptake of 392 p.s.i.g. of carbon monoxide. During the reaction additional carbon monoxide was added when the pressure dropped to about 200 p.s.i.g. After a total reaction time of five hours the reaction vessel was cooled and the remaining carbon monoxide vented. The aqueous reaction mixture was decanted into a flasked under a nitrogen atmosphere and the solution filtered under nitrogen to give only 0.42 part of a pink solid. The pink solid turned brown-green on standing. On heating the solid to 1000° C. it became crystalline and was shown by X-ray diffraction to be cobalt oxide.

The filtrate gave a positive test for cobalt tetracarbonyl anion when complexed with tetraethyl ammonium iodide. The solution was stirred and heated while blowing air through the solution until a very fine black solid precipitated. The supernatant liquid tested negative for cobalt tetracarbonyl anion. The black solid was partly amorphous, but on heating to 1000° C. became crystalline, and by analysis on X-ray diffraction was found to contain about 70 percent $Co_3O_4$ and about 30 percent CoO. The black solid weighed 0.68 part and is equivalent to a total of 0.25 part of cobalt recovered in the reaction solution as the cobalt tetracarbonyl anion from 1 part of cobalt as cobalt chloride hexahydrate. This is a yield of 52 percent by weight.

EXAMPLE 3

The procedure of Example 2 is repeated with 3 parts of sodium carbonate being used instead of sodium hydroxide. The amount of ammonia was slightly less than that used in Example 2. After reaction according to the procedure of Example 2 for four and one-half hours, the pink solid and the reaction mixture filtrate were worked up as described with a yield of 68 percent of cobalt as the cobalt tetracarbonyl anion.

Examples 2 and 3 indicate clearly that the addition of a strong base; for example, caustic or sodium carbonate acts to stabilize the formation of cobalt tetracarbonyl anion which produces good yields of the cobalt compound. The variation of several reaction components using the basic procedure of Example 1 allows the yield of cobalt tetracarbonyl anion to be increased to a very high degree. The following table showing Examples 4 to 7 illustrates the carbonylation of cobalt to maximize the yield of cobalt tetracarbonyl anion.

EXAMPLE 8

A solution of basic nickel and cobalt carbonates was prepared by dissolving 4 parts of $NiCl_2 \cdot 6H_2O$ and 0.4 part of $CoCl_2 \cdot 6H_2O$ in 100 parts of water and precipitating the hydroxides with 6.12 parts of 50 percent NaOH. The solids were then filtered and washed with water. The resulting solids were placed in a beaker. A solution was prepared by adding to a reaction flask 19.7 parts of $$(NH_4)_2CO_3 \cdot H_2O$$

74 parts of water, and 66.6 parts of concentrated (30 percent) $NH_4OH$. A total of 16 parts by volume of this solution was required to dissolve the solid nickel and cobalt hydroxides. A few parts of water was added to this for fluidity.

The solution resulting was added to a reaction vessel as described in Example 1 with 0.48 part of $Na_2CO_3$ in 10 parts of water, and 27 parts of concentrated (30 percent) $NH_4OH$. Additional water was added to make a solution of 100 parts by volume. To this was added 0.195 part of KCN. The reaction vessel was sealed and the procedure of Example 1 was followed for the carbonylation. Reaction conditions were 125° C., 300 p.s.i.g. of carbon monoxide for two hours. Total pressure drop was 153 p.s.i.g. The clear aqueous reaction solution tested positive for $Co(CO)_4^-$ as a complex with $(C_2H_5)_4N^+I^-$. From this, 0.097 part of cobalt was recovered by precipitation from the aqueous solution with air as $Co_2O_3 \cdot H_2O$. In addition, .794 part of Ni was produced as $Ni(CO)_4$. The yield of Ni was about 79 percent and of cobalt about 88 percent.

When a similar run is attempted without the addition of base such as the $Na_2CO_3$ in Example 8 above, the aqueous solution remaining will not test positive for the presence of $Co(CO)_4^-$. Analysis of the solid residue indicates that the cobalt is precipitated as $CoCO_3$.

EXAMPLE 9

The procedure of Example 2 is repeated except the NaOH is replaced with $NaHCO_3$. Cobalt is obtained as the $Co_2O_3 \cdot 3H_2O$ in good yield. This is dried and reduced to cobalt metal by hydrogen reduction.

Similarly such bases as $Na_2O$, $KHCO_3$, $K_2CO_3$, KOH, $CaCO_3$, $Ca(OH)_2$, CaO, $Ba(OH)_2$, $BaCO_3$, and BaO may be substituted for the base in the above example.

TABLE 1.—CARBONYLATION OF COBALT

| | Mole, parts | | | | | Conditions | | | Results | | |
|---|---|---|---|---|---|---|---|---|---|---|---|
| | Co as | NH₃ as— | | | | | | CO press | Reaction mixture Co | Solid | Co¹ | Percent |
| Ex. No. | $CoCl_2 \cdot 6H_2O$ | $(NH_4)_2CO_3$ | $NH_4OH$ | $Na_2CO_3$ | KCN | Temp. (° C.) | Time (min.) | drop (p.s.i.) | $(CO)_4^-$ test | $Co_2O_3 \cdot 3H_2O$ | recovered | yield of Co |
| 4 | 0.017 | 0.030 | 0.395 | 0.030 | 0.003 | 125 | 120 | 122 | + | 1.00 | .538 | 53.8 |
| 5 | 0.017 | 0.030 | 0.395 | 0.030 | 0.003 | 125 | 240 | 134 | + | 1.10 | .566 | 56.6 |
| 6 | 0.017 | | 0.268 | 0.058 | 0.003 | 125 | 240 | 145 | + | 1.50 | .627 | 62.7 |
| 7 | 0.017 | | 0.842 | 0.058 | 0.003 | 125 | 240 | 258 | + | 1.50 | .826 | 82.6 |

¹ Parts by weight.

These examples clearly illustrate the requirement for having a strong base in the reaction mixture for stabilization of the $Co(CO)_4^-$. Similar results can be obtained when the base employed is KOH, CaOH, BaOH, $NaHCO_3$, $K_2CO_3$, $KHCO_3$, $CaCO_3$, $BaCO_3$, $Na_2O$, $K_2O$, CaO, BaO, and the like.

Since cobalt and nickel are such closely associated metals both chemically and physically as found in nature, the effect on this reaction system of adding nickel was considered important; any resulting sacrifice in yield of nickel would adversely affect a particular process. The following example illustrates the invention in stabilizing the $Co(CO)_4^-$ in the reductive carbonylation of a nickel-cobalt system.

EXAMPLE 10

The procedure of Example 2 is repeated except that a molar ratio of 10 moles of NaOH per mole of cobalt is employed in the reaction mixture. Cobalt is recovered as $Co_2O_3 \cdot 3H_2O$ in good yield.

From Example 2 and the above example, it is clear that a molar ratio of from 1 to about 10 moles of base is preferred in the improved process of this invention; most preferred is a molar ratio of from 1 to about 2 moles of base per mole of cobalt.

While the process of this invention has been illustrated by using cobalt and nickel chlorides as starting materials, it is clear that any reducible salt of cobalt and nickel may be employed. Such nickel and cobalt salts can be present in the reaction mixture at concentrations of from 0.01 gram per liter up to saturated solutions. Further, supersaturated solutions or slurries are typically employed. Preferably, the nickel and cobalt are present in the reaction mixture at from 0.01 to about 250 grams per liter. As the nickel and cobalt compounds occur in their ores, they may be present after processing in solutions or slurries at concentrations of 40 to 50 grams per liter of nickel and of 0.7 to 10 grams per liter of cobalt. The concentration of metal salts is not critical but should be large enough to allow processing with economically sized equipment.

The particular method for establishing the aqueous reaction mixture is not critical. Several commercially practiced methods of economically separating the metal values from their ores and preparing aqueous solutions or slurries which would be suitable for reductive carbonylation are described by Boldt, Jr., et al., The Winning of Nickel, D. Van Nostrand Co., New York, N.Y. (1967), at pps. 90–336 and 425–453. These sections describe the extractive metallurgy of sulfide and oxide nickel ores, respectively, and particularly hydrometallurgical processes for winning nickel, and as well, cobalt and copper.

One process which was commercially practiced to produce nickel and cobalt from a lateritic nickel ore employed the steps of crushing and grinding the ore, drying and sizing the ore particles for convenient processing, partially reducing the ore to the metals, cooling the reduced ore under non-oxidizing conditions, oxidatively leaching the reduced ore with aqueous ammonia and carbon dioxide to dissolve the nickel and cobalt as thin carbonates, and then boiling the leach solution to concentrate the nickel and cobalt values which precipitate as the basic carbonates and recover ammonia and carbon dioxide values. According to the known process the nickel was then calcined to produce nickel oxide containing small amounts of cobalt oxide. Cobalt was minimized by conducting the reduction step selectively, but at the same time sacrificing some nickel. By the process of this improved reductive carbonylation process the reduction can be carried out under more stringent conditions to obtain substantially all of the cobalt and nickel values; and on reductively carbonylating the solution or slurry of the resulting nickel and cobalt basic carbonates, good yields of both nickel and cobalt result.

The uses of nickel and cobalt are well known for alloys with steel to form stainless steel, high temperature alloys, hard facing and wear resistant alloys and similar uses which are readily apparent to skilled metallurgists.

As sources for nickel and cobalt which are suitable for establishing solutions or slurries for reductive carbonylation by this improved process, there may be mentioned ores, ore concentrates, furnace mattes, smelter mattes, converter mattes, leach solutions, precipitates from leach solutions, granulated products from rapidly quenched mattes, sea nodules, scrap metal, and the like. Such sources when appropriately treated as described for example in Boldt, supra, are suitable starting materials for the improved process of this invention.

The above description is illustrative and this invention is intended to be limited only by the lawful scope of the following claims.

We claim:
1. In a process for the recovery of cobalt from an aqueous ammoniacal ammonium salt solution or slurry of a reducible cobalt salt, said process comprising contacting said solution or slurry with a carbon monoxide-containing gas at a carbon monoxide pressure of from 100 to 1000 p.s.i.g. and a temperature of from 100 to 400° C. in the presence of a catalytic amount of a ligand selected from the group consisting of cyanide, sulfide, cysteine, and tartrate to form soluble cobalt tetracarbonyl anion, and decomposing said cobalt tetracarbonyl anion to recover its cobalt value, the improvement comprising adding a sufficient amount of a strong base to stabilize the formation of said cobalt tetracarbonyl anion prior to the step of carrying out said contacting.

2. A process of claim 1 wherein said strong base is selected from the group consisting of alkali metal oxides, alkali metal hydroxides, alkali metal carbonates, alkaline earth metal oxides, alkaline earth metal hydroxides and alkaline earth metal carbonates.

3. A process of claim 2 wherein said strong base is selected from NaOH, $Na_2CO_3$, and KOH.

4. A process of claim 3 wherein said strong base is present in an amount of from 1 to about 10 moles of said strong base per mole of cobalt.

5. A process of claim 4 wherein said strong base is present in an amount of from 1 to 2 moles of said strong base per mole of cobalt.

6. A process of claim 5 wherein said strong base is NaOH.

7. In a process for recovering cobalt from a solution or slurry formed by partially reducing and oxidatively leaching a lateritic ore with aqueous ammoniacal ammonium carbonate, said process comprising contacting said solution or slurry with a carbon monoxide-containing gas at a pressure of from 100 to 1000 p.s.i.g. and a temperature of from 100 to 400° C. in the presence of a catalytic amount of a ligand selected from the group consisting of cyanide, sulfide, cysteine, and tartrate to form soluble cobalt tetracarbonyl anion, injecting an oxygen-containing gas into the reaction mixture formed to oxidize the cobalt values to insoluble hydrated cobalt oxide, separating said hydrated cobalt oxide from said reaction mixture, heating said hydrated cobalt oxide to drive off the waters of hydration and recovering the cobalt oxide produced, the improvement comprising adding from 1 to 2 moles, per mole of cobalt, of a strong base selected from the group consisting of NaOH, $Na_2CO_3$, and KOH prior to carrying out said contacting.

References Cited

UNITED STATES PATENTS

| | | | |
|---|---|---|---|
| 1,686,391 | 10/1928 | Muller et al. | 75—103 |
| 3,079,235 | 2/1963 | Dakli et al. | 23—203 C |

OTHER REFERENCES

Wender et al., "Bureau of Mines, Bulletin 600," 1962, pp. 14–21.

HERBERT T. CARTER, Primary Examiner

U.S. Cl. X.R.

75—119; 23—203 C, 183